United States Patent [19]

Morrill

[11] Patent Number: 4,492,357

[45] Date of Patent: Jan. 8, 1985

[54] FLEXIBLE CONDUIT CONNECTION FOR MOTOR

[75] Inventor: Giles W. Morrill, Erwin, Tenn.

[73] Assignee: Morrill Motors of Virginia, Inc., Pemington Gap, Va.

[21] Appl. No.: 448,796

[22] Filed: Dec. 10, 1982

[51] Int. Cl.³ .............................................. F16M 5/00
[52] U.S. Cl. .................................... 248/674; 248/300
[58] Field of Search ............... 248/674, 675, 75, 74.5, 248/74.7, 74.8, 300, 295.1, 51, 56, 74 PB; 174/153 G

[56] References Cited

U.S. PATENT DOCUMENTS

| | | | |
|---|---|---|---|
| 647,169 | 4/1900 | Vogel | 248/74.8 |
| 1,600,816 | 9/1926 | Harbert | 248/295.1 |
| 1,600,859 | 9/1926 | Wright | 249/295.1 |
| 2,045,336 | 6/1936 | Skoglund | 248/75 |
| 3,182,544 | 5/1965 | Rapata | 174/153 G |
| 3,332,650 | 7/1967 | Judge | 248/300 |
| 3,430,905 | 3/1969 | Pepe | 248/300 |
| 3,499,097 | 3/1970 | Widstrand | 174/153 G |
| 3,711,050 | 1/1973 | Case | 248/300 |
| 3,717,319 | 2/1973 | Schultz | 248/51 |
| 3,740,013 | 6/1973 | Bentley | 248/300 |
| 3,751,579 | 8/1973 | Nojiri | 248/56 |
| 4,248,459 | 2/1981 | Pate | 248/74.5 |

Primary Examiner—Reinaldo P. Machado
Assistant Examiner—Alvin Chin-Shue
Attorney, Agent, or Firm—Jeffers, Irish & Hoffman

[57] ABSTRACT

An A-shaped fan motor mounting bracket including an arrangement for securing a motor lead protective sheath, such as a flexible metal conduit through which electrical leads for the motor pass, so as to minimize flexing of the leads between the motor and the sheath. In a preferred form, the sheath securing arrangement includes a U-shaped strap having opposed free ends adapted for attachment to the bracket closely adjacent motor so as to encircle and grip the sheath between the strap and bracket. The strap may include a ridge within the concave portion thereof for engaging a corresponding trough in the surface of the flexible metal conduit and the bracket portion to which the strap is attached may be inclined obliquely to the motor rotor axis of rotation for better alignment with the leads which extend obliquely from a strain relief grommet. In an alternate form the flexible metal conduit has a generally helical ridge and trough surface pattern and the bracket is provided with a non-circular opening into which the sheath may be threaded to secure the sheath directly to the bracket.

7 Claims, 8 Drawing Figures

FLEXIBLE CONDUIT CONNECTION FOR MOTOR

BACKGROUND OF THE INVENTION

Field of the Invention

The present invention relates generally to the mounting of electric motors, such as unit bearing fan motors, and more particularly to the mounting of a motor and its associated electrical lead-protecting sheath in close proximity with one another so as to minimize any flexing of the leads between the end of the sheath and the motor.

A-shaped motor mounting brackets formed from flat sheet metal are known and are advantageous in that they do not readily transmit motor vibration to the mounting surface and represent a reduction in both weight and material cost when compared to other motor mounting brackets. Such brackets may be employed, for example, in supporting a motor-driven fan which circulates air past a condense in a refrigeration device. In such devices it is desirable and sometimes mandatory that individual insulated electrical conductors or motor leads be enclosed in a typically flexible metal conduit for safety reasons. Secure clamping of such a flexible metal conduit at the end closest the motor has heretofore been accomplished using a two-piece die cast clamp arrangement of substantial cost. It would be highly desirable to eliminate this clamp, reduce the number of parts, and facilitate assembly of such motor mounting arrangements.

SUMMARY OF THE INVENTION

Among the several objects of the present invention may be noted the achievement of the above-mentioned goals and elimination of the above-mentioned defects; the provision of a modification to an A-shaped motor mounting bracket which facilitates the fastening of a motor lead protective sheath to the bracket; the provision of an overall improvement in motor mounting brackets; and the provision of a U-shaped clamp for securing a flexible metal conduit in position closely adjacent an electric motor. These as well as other objects and advantageous features of the present invention will be in part apparent and in part pointed out hereinafter.

In general, a mounting bracket for an electric motor, which both supports the motor and securely anchors a flexible metal conduit end, is formed from an elongated section of sheet metal by introducing four arcuate angle bends along generally parallel lines yielding a central portion for supporting the motor with legs depending outwardly therefrom and terminating in feet for attachment to a supporting surface. The central portion bracket also forms at least part of the flexible conduit clamping arrangement so that flexing of the motor leads between the motor and the conduit end is substantially prevented. The clamping means may take the form of a non-circular hole in the central portion through which the flexible conduit may be threaded or the clamping means may comprise a separate U-shape member for encompassing the conduit and fastened at the free ends thereof to the central portion. In a preferred form, the central portion is downwardly inclined somewhat so as to better align the leads emanating from the motor and the orientation of the leads at the location where the conduit is clamped to the central portion so that lead bending is minimized.

Also, in general and in one form of the invention, a bracket is provided for mounting a motor and fan blade on a supporting surface adapted to space the motor from the surface so as to provide adequate clearance between the fan blade and the surface which has an arrangement for securing a motor lead protective sheath, such as a flexible metal cable of the type having a generally helical groove and trough pattern on the surface thereof, to the bracket. The securing arrangement may take the form of a U-shaped strap having opposed free ends which are to be attached to the bracket closely adjacent the motor so as to encircle and grip the sheath between the strap and the adjacent bracket. The strap may be oriented to optimize alignment of the cable where clamped with the motor leads where they pass obliquely through a motor end bell.

BRIEF DESCRIPTION OF THE DRAWINGS

Corresponding reference characters indicate corresponding parts throughout several view of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENTS

Figure 1:
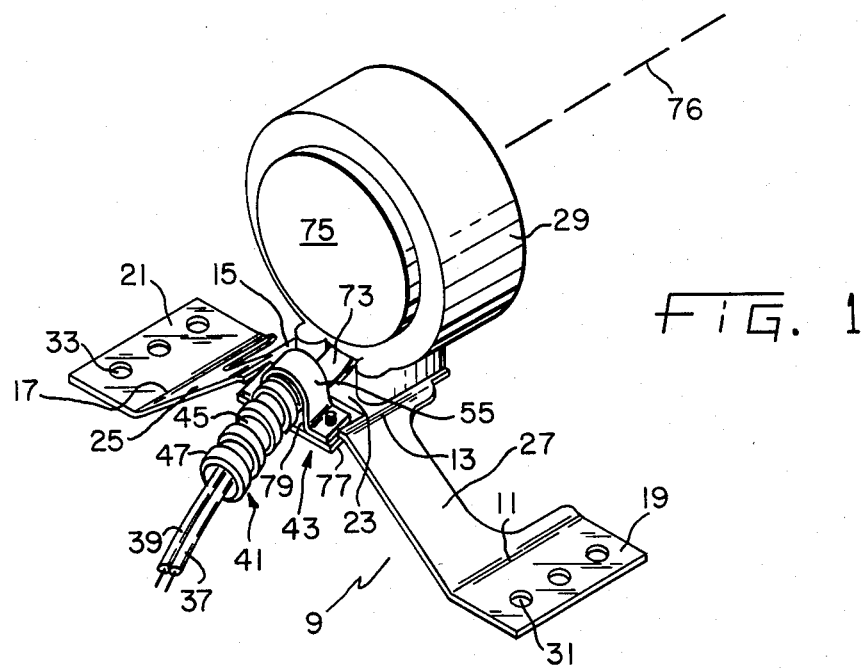
FIG. 1 is a perspective view of a motor, motor mounting bracket and protective sheath surrounding the motor leads illustrating the invention in a preferred form.
Figure 2:
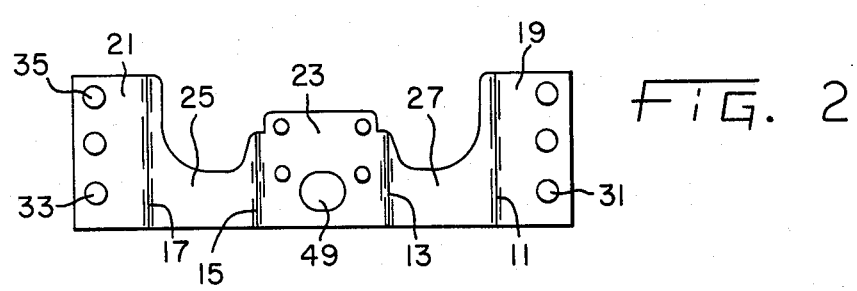
FIG. 2 is a plan view of a mounting bracket similar to that illustrated in FIG. 1 but illustrating a first modification.
Figure 4:
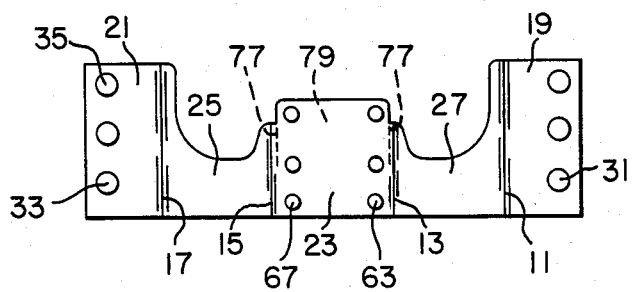
FIG. 4 illustrates a second variation of the mounting bracket of FIG. 1.

Referring first to FIGS. 1, 2 and 4, each of the illustrated mounting brackets is similar to the others in the following respects. The bracket 9 is formed from an elongated relatively flat section of sheet metal by making four distinct bends in the sheet metal through acute angles of, for example, around 45° to 60°. These four bends occur generally along four parallel lines 11, 13, 15 and 17 (FIG. 4) so that a pair of generally coplanar feet 19 and 21 extend parallel to and displaced from the central portion 23 with the central portion and feet interconnected by the depending legs 25 and 27.

An electric motor 29, such as a unit bearing fan motor, is fastened to the central portion 23 of bracket 9 as by four screws passing upwardly through the bottom there of as viewed in FIG. 1, and the motor and bracket are in turn fastenable to a support surface by passing mounting bolts through the feet apertures such as 31 and 33. The mounting bracket as thus far described is conventional and the features are common to the several disclosed embodiments.

In FIG. 1, the motor 29 has insulated electrical leads 37 and 39 passing through a protective sheath, such as a flexible metal conduit 41, for example of the commercially available type having a helical trough 45 and ridge 47 pattern along the surface thereof. Flexible metal conduit 41 is fastened to the central portion 23 of the mounting bracket 9 by a clamping arrangement 43 and the specific clamp illustrated in FIG. 1 will be better understood after discussing the variations thereon illustrated in the remaining figures.

Figure 3A:
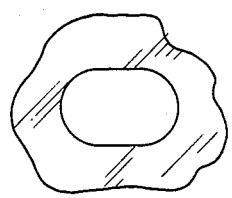
FIGS. 3a, 3b and 3c illustrate possible aperture outlines suitable for use in the embodiment of FIG. 2.
Figure 3B:
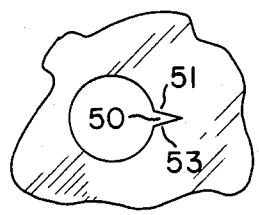
Figure 3C:
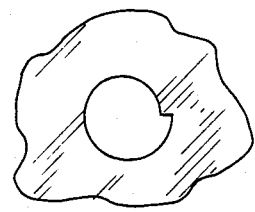

Since the flexible metal conduit 41 has a helical ridge and trough pattern 45, 47, the conduit may be aligned with an opening 49 in central portion 23 as illustrated in FIGS. 2 and 3 and relative rotation of the conduit and bracket will result in the conduit threadedly passing through the opening 49. The opening 49 is preferably non-circular and may be somewhat elliptical as FIG. 3a illustrates, or may be generally circular but having a notch 50 with adjacent metal portions 51 and 53 deviated somewhat to accept the ridge 47 in a threading manner as illustrated in FIG. 3b, or may have a somewhat spiraled periphery as illustrated in FIG. 3c to threadedly receive the conduit 41. In each case the conduit 41 is securely held within the central bracket portion 23 with rotation of that conduit being required for its removal. Thus, with the embodiment illustrated in FIGS. 2 and 3, no additional parts are required to effect the clamping of the conduit to the bracket.

In the embodiment of FIGS. 2 and 3, the conduit 41 extends generally perpendicular to the central bracket portion 23, and this arrangement may with some motors require an undesirable bend of the electrical leads 37 and 39 between the conduit end and their point of entry into the motor 29. Alignment of the conduit parallel to the surface of central bracket portion 23 may be achieved using the arrangement illustrated in FIGS. 1, 4 and 5.

Figure 5:
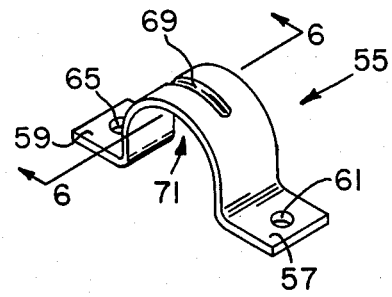
FIG. 5 illustrates a U-shaped strap suitable for use in the embodiment of FIG. 1 or the embodiment of FIG. 4.
Figure 6:
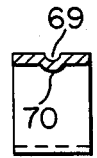
FIG. 6 is a view in cross section along line 6—6 of FIG. 5.

In FIG. 5, a U-shaped strap 55 has the free ends 57 and 59 adapted for attachment to the central bracket portion 23 of FIG. 4 by passing metal screws or bolts through holes 61 and 63, and 65 and 67, respectively, so that the clamp or strap 55 in conjunction with the central portion 23 between holes 63 and 67 may embrace the flexible metal conduit 41 securely clamping that conduit to the central portion 23. An elongated groove 69 which defines a corresponding ridge 70 within the concave portion 71 of the strap may be provided for engaging a corresponding portion of a trough 45 in the conduit 41 to more securely grip that conduit.

The fan motor 29 illustrated in FIG. 1 has leads 37 and 39 passing through a strain relief grommet 73 near the bottom of end bell 75 with those leads extending from the motor at an oblique angle to the motor rotor axis 76. Thus, the leads emanating from the motor 29 must bend in one direction or another to align with the clamped conduit according to FIG. 4 or with the clamped conduit according to FIGS. 2 and 3. Better alignment between the conduit 41 and leads 37, 39 is achieved by positioning the clamped section of conduit 41 obliquely to the surface of central bracket portion 23 as in FIG. 1. This oblique positioning of the clamp 55 is achieved by providing a pair of slits such as 77 extending part way across central portion 23 from one edge of the sheet metal section in a direction generally parallel to the four bend lines 11, 13, 15, 17 so that a region 79 of the central bracket portion 23 may be bent or inclined obliquely to the remainder of that central portion to minimize bending of the motor leads between grommet 73 and the conduit 41. Thus, the bracket illustrated in FIG. 4 may be modified slightly by providing the slits such as shown in dashed lines at 77 and bending the region 79 downward somewhat to provide the bracket piece of FIG. 1. The same U-shaped strap 55 may then be positioned on the bracket to clamp the flexible conduit 41. Preferably, the region is bent through about a 45° angle to best align the conduit and leads for the illustrated motor 29.

From the foregoing, it is now apparent that a novel flexible conduit connector, as well as a novel overall improvement in motor mounting brackets, has been disclosed meeting the objects and advantageous features set out hereinbefore as well as others, and that modifications as to the precise configuration, shapes and details may be made by those having ordinary skill in the art without departing from the spirit of the invention or the scope thereof as set out by the claims which follow.

What is claimed is:

1. A mounting bracket for an electric motor which provides both support for the motor and a secure anchor for one end of a flexible metal conduit through which electrical leads for the motor pass, the bracket being formed from an elongated relatively flat section of sheet metal by making four distinct bends in the sheet metal through acute angles along four generally straight lines each extending generally perpendicular to the direction of sheet metal elongation so as to define a central bracket portion to which a motor may be attached, a pair of depending legs extending from opposite sides of the central portion and a pair of feet each at a leg end remote from the central portion with the feet adapted to be mounted on a support surface, and means for securely clamping a flexible metal conduit to the central portion to prevent flexing of leads extending from an end of the conduit near the clamping means to a motor attached to the central portion, the clamping means comprising a U-shaped strap and means for fastening the opposed free ends thereof to the central bracket portion, the central bracket portion including a region for receiving the strap, the region being inclined obliquely to the remainder of the central portion to minimize bending of the motor leads.

2. The mounting bracket of claim 1 wherein the flexible metal conduit is of the type having a generally helical ridge and trough outer surface configuration, the strap including a ridge within a concave portion of the strap for engaging a corresponding portion of a trough in the conduit surface.

3. The mounting bracket of claim 1 wherein the central bracket portion is provided with a pair of slits extending part way across the central portion from one sheet metal section edge generally parallel to the four bend lines to facilitate oblique inclination of the region.

4. The mounting bracket of claim 1 wherein the region is inclined at about 45° to the remainder of the central bracket portion.

5. In a bracket for mounting a motor and fan blade on a supporting surface adapted to space the motor from the surface to provide adequate clearance between the fan blade and the surface, an arrangement for securing a motor lead protective sheath to the bracket to minimize flexing of motor leads between the motor and the sheath comprising a U-shaped strap having opposed free ends adapted for attachment to the bracket closely adjacent the motor to encircle and grip the sheath between the strap and bracket, the bracket region to which the strap may be attached being inclined obliquely to the motor rotor axis of rotation to minimize bending of the motor leads.

6. The arrangement of claim 5 wherein the protective sheath comprises a flexible metal conduit of the type having a generally helical ridge and trough outer surface configuration, the strap including a ridge with a concave portion of the strap for engaging a corresponding portion of a trough in the conduit surface.

7. A mounting bracket for an electric motor which provides both support for the motor and a secure anchor for one end of a flexible metal conduit through which electrical leads for the motor pass, the flexible conduit being of the type having a generally helical ridge and trough outer surface configuration, the bracket being formed from an elongated relatively flat section of sheet metal by making four distinct bends in the sheet metal through acute angles along four generally straight lines each extending generally perpendicular to the direction of sheet metal elongation so as to define a central bracket portion to which a motor may be attached, a pair of depending legs extending from opposite sides of the central portion and a pair of feet each at a leg end remote from the central portion with the feet adapted to be mounted on a support surface, and means for securely clamping a flexible metal conduit to the central portion to prevent flexing of leads extending from an end of the conduit near the clamping means to a motor attached to the central portion, the clamping means comprising a non-circular aperture in the central bracket portion into which the helically configured conduit may be threadedly inserted by relative rotation of the conduit and bracket.

* * * * *